June 7, 1966  J. J. MAUGET  3,254,449
METHOD AND APPARATUS FOR INJECTING PLANTS
Filed July 26, 1965
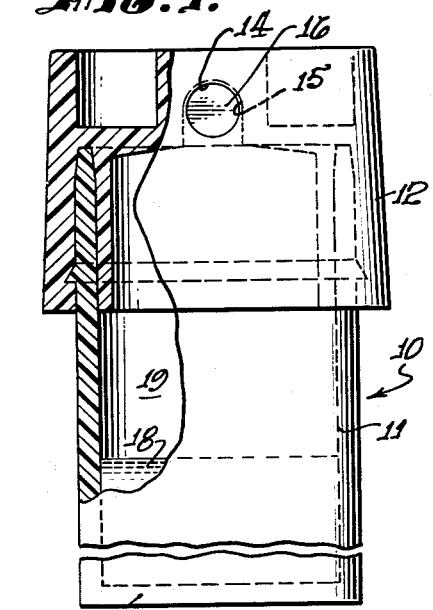
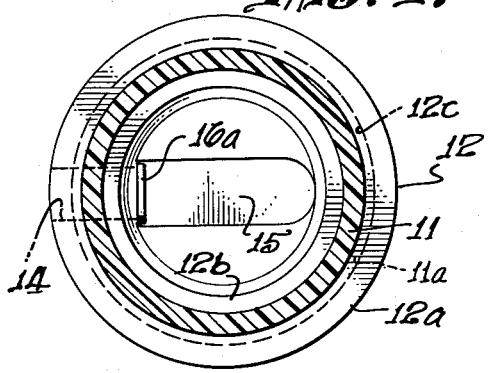
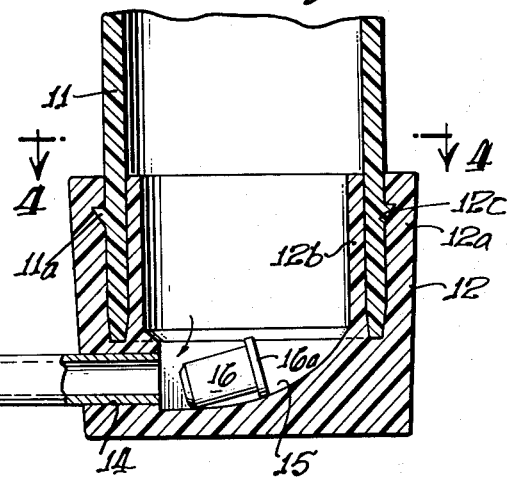
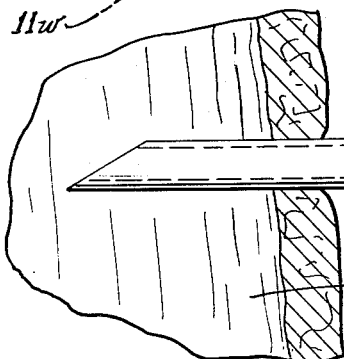
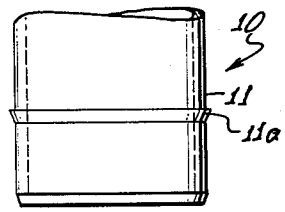
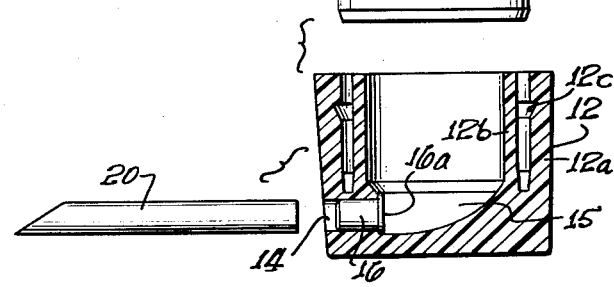
JAMES J. MAUGET,
INVENTOR.
BY Knight & Rodgers
ATTORNEYS.

United States Patent Office

3,254,449
Patented June 7, 1966

3,254,449
METHOD AND APPARATUS FOR INJECTING PLANTS
James J. Mauget, 1043 Bilton Way, San Gabriel, Calif.
Filed July 26, 1965, Ser. No. 478,525
9 Claims. (Cl. 47—57.5)

The present invention relates generally to method and apparatus for injecting plants with liquids of various types; and more especially to the development of apparatus and technique for safe handling of toxic solutions in containers and under a slight superatmospheric pressure for treating plants by injection methods.

This application is a continuation-in-part of my co-pending application Serial No. 197,798, filed May 25, 1962 (now abandoned), for Method and Apparatus for Injecting Plants.

The plants most commonly treated by the injection methods are trees because they have a large stem or trunk; but, generally speaking, any shrub or bush or other plant with a main stem of a size sufficient to receive the feeding tube can be treated by injection methods and means.

Injection of a plant is carried out by inserting a feeder tube into the stem of the plant deeply enough that the open inner end of the tube is inwardly of the cortex layer of the trunk. The equipment may be compared with a hypodermic needle used on humans; and the injection method is similar to intravenous injection or feeding since the result is the injection of the desired liquid directly into the sap stream of the plant.

In addition to the administration of nutritional solutions, various liquids may be administered to effect growth control, prevention of disease, and elimination of insects which feed upon the leaves or upon the woody structure of the plant. These methods of treatment are generally referred to as chemo-therapy. Insects as well as virus and fungus infections can now be controlled in many situations by the use of various antibiotics and systemic insecticides. Research has shown the insecticides now available are very effective in controlling, combating and eliminating various insect pets and thereby the spread of many diseases. The spread of diseases, for example the Dutch elm disease, can in many cases be controlled by administering antibiotics and insecticides to infected plants. Chemotherapeutic methods often achieve results that are extremely difficult if not impossible to achieve by more conventional methods of treating plant diseases and infections.

However, serious problems arise in the handling and application by injection of toxic liquids to trees and other plants. Liquids have in the past been administered by gravity type reservoirs attached to feeder tubes inserted in the plant stems. While these feeders are entirely satisfactory for many situations, they have certain definite limitations which render them unsuitable for handling toxic materials. This is chiefly because the gravity feeders are not hermetically sealed and are therefore not suitable for handling of modern systemic insecticides which are toxic to humans and should, for safety reasons, be shipped, sold and otherwise handled only in completely sealed containers.

At the present time there are known and available for treatment of plants various systemic insecticides of very superior and effective action that offer the utmost in plant protection. For example, phosphate base insecticides. However, these materials are of such high toxicity to humans and warm blooded animals that official regulations bar their use by the home gardener and make even their use by licensed persons cumbersome and expensive. This is because of the great hazard of being poisoned by inhalation of the fumes or by direct contact with the materials themselves, hazards which are present with previously available means for applying materials to plants by injection methods. The same hazards are also involved in the general handling, transportation, and distribution of the toxic materials themselves.

Thus it becomes a general object of my invention to provide a safe method and means for handling and injecting into plants liquids that are highly toxic to humans and to make such toxic materials generally available to the public at large by substantially eliminating the hazards involved with such materials to the users of other people.

It is also an object of the invention to provide improved feeder means for positively injecting liquids into plants to increase the capacity and feeding rate of such apparatus.

A further object of the invention is to design a container of novel construction which is particularly designed to be completely self-emptying.

A still further object of the invention is to devise a safe method of handling toxic materials and injecting the material into a stem of a plant.

These objects of the invention have been achieved in an apparatus for injecting liquids directly into the stem of the plant, comprising a hermetically sealed container, preferably formed from a cup closed at one end and a cap closing the open end of the cup to form the container holding a quantity of liquid to be administered to a plant. The container has a thickened wall portion through which a discharge passage extends, said passage being adapted to receive an injection tube and being initially closed by a displaceable plug at its inner end to prevent liquid in the container from entering the passage. A combined container unsealing and liquid injection tube has one end insertable in the passage to a position at which the tube displaces said plug inwardly of the passage and opens the passage to receive the liquid in the container. The other end of the tube is sharpened and is insertable into the stem of a plant to administer the liquid to the plant. The tube is a rigid member continuously open throughout its full length, and of a size to fit tightly in the discharge passage. A body of gaseous propellant above and in direct contact with the liquid in the container exerts a sufficient pressure thereon to discharge all of the liquid rapidly from the container into the plant.

Safe handling of the toxic liquid is insured by enclosing the liquid in a sealed, gas-tight container along with the gaseous propellant, first setting the sharpened end of the hollow injection tube in the stem of the plant to be injected, and then inserting the other end of the tube in the discharge passage in the container to effect a liquid tight seal between the tube and the container before the plug is displaced, so that the user is at no time exposed to either the fumes from the toxic material or contact with the liquid itself. The container wall is breached by the tube to allow the liquid to be discharged into the plant through the feeder tube.

How the above and other objects of my invention are attained will be better understood by reference to the following description and to the annexed drawing in which:

FIG. 1 is a combined side elevation and partial section of a liquid injection device illustrating a preferred embodiment of the present invention.

FIG. 2 is a fragmentary vertical section showing the disposable container mounted on a feeder tube in position for injecting liquid into the stem of a tree or other plant.

FIG. 3 is an exploded view showing a portion of the container, the cap in section, and the feeder tube and the relative positions of the parts as they are assembled.

FIG. 4 is a horizontal section on line 4—4 of FIG. 2.

Referring now to the drawing, there is shown in FIG. 1 a fluid injection device constructed according to the present invention which comprises a sealed container indicated generally at 10. The container is preferably made in two parts, a cup 11 and a cap 12, which fit together in a telescoping relation. The cup is cylindrical in shape and closed at one end by an integral wall 11w, the other open end being closed by cap 12 which provides an end wall for the container at the opposite end thereof.

As may be seen both in FIGS. 1 and 2, cap 12 comprises a pair of spaced annular skirts 12a and 12b between which the wall of cup 11 is received. The inner skirt 12b is designed to fit snugly within the inner cylindrical surface of the cup and to effect a fluid tight seal with the inner face of the cup wall, when the cup and cap are telescoped together. It will be appreciated that internal pressure within the container tends to improve or increase the sealing contact between the annular skirt 12b and the cup wall, thus assuring that the liquid contents of the container are securely enclosed.

The outer skirt 12a is of a diameter to slide snugly over the outer face of the cup wall and is provided with locking means holding the cap in place on the cup. As shown particularly in FIG. 2, it will be seen that cup 11 has an external ridge 11a of angular cross section. Cup 12 is provided with a corresponding groove 12c on the inner face of skirt 12a. When the cap is forced over the end of the cup, locking ridge 11a enters and seats firmly in groove 12c, holding the cap in place and resisting any tendency to separate the two parts of the container. The annular space between the two skirts is preferably tapered inwardly slightly to effect a tight engagement with the cup wall.

Ridge 11a and groove 12c are preferably of right triangular cross section, as shown. Thus each has a generally radial surface forming an annular shoulder. The two shoulders face oppositely to engage each other as in FIG. 2, forming a non-releasable locking means preventing separation of the cup and cap once they are sealed together. Hence, the container, for practical purposes, cannot be re-opened and re-filled.

The cup may be made of any suitable material. Glass is satisfactory for many purposes, having the advantage that it is chemically inert with respect to all liquids which might be used and may also be transparent, making it very simple to tell whether a container is full or empty. However, I prefer to make the cup of a high density polyethylene which is likewise inert with respect to most of the materials with which it may be used. It may be translucent. In addition, the polyethylene has the advantage of being more shock resistant than glass and therefore greatly reducing the possible hazard of breaking.

The cap is preferably made of low or medium density polyethylene or similar material that is slightly deformable and also elastic in order that the cap can expand to pass over locking ring 11a as the cap is pushed into position. This resiliency causes the outer skirt of the cap to contract snugly around the exterior of the cup, once the locking ridge has entered groove 12c. As a result, the two members are securely held against accidental separation which might open the container and expose users to the toxic contents.

Materials such as glass or highly density polyethylene are preferred for the cup as they have little or no permeability to the gaseous propellant. Low permeability to gas permits the wall of the cup to be relatively thin, producing a light-weight container as the cup normally constitutes the major portion of the container. The cap, when of low or medium density polyethylene, has a relatively higher permeability for a given wall thickness; so this is compensated for by making the walls of the cap thicker as shown, especially the end wall. This is also a reason why plug 16 is preferred as a means for closing passage 14, as the plug has sufficient length to have satisfactorily low gas permeability. The low or medium density polyethylene in the cap provides an advantageous material that engages the inside wall of the cup with a gas and liquid tight contact without requiring cement or the like.

It will be noted that in the preferred form cap 12 is provided with a short fluid passage 14 which communicates at one end with the exterior of the cap and at the other end with the interior space of the container. Passage 14 is located in the relatively thicker wall portion of the container, provided by cap 12. This permits plug 16 at the inner end of the passage to be long enough to develop a fluid tight seal with the passage wall and also be long enough to have acceptably low gas permeability. Furthermore, passage 14 can be made longer than plug 16 thereby obtaining various advantages, including the fact that the plug is recessed and thereby protected against being struck from the outside in a manner to dislodge it accidentally. The axis of fluid passage 14 is preferably but not necessarily, substantially perpendicular to the longitudinal axis of the container so that when the latter axis is vertical, the passage 14 is horizontally disposed as in FIG. 2.

Inside cap 12 is a sump 15 which drains the liquid contents of the container to the inner end of passage 14. The walls of sump 15, as well as the surrounding walls of the cup slope downwardly and inwardly when the container is in inverted position of FIG. 2 so that the liquid within the container is directed by the sloping walls to the inlet end of passage 14.

Passage 14 is initially closed by a displaceable sealing means which preferably takes the form of cylindrical plug 16 inserted into passage 14 from the inner or inlet end thereof. The plug preferably has a small flange 16a at one end which bears against a shoulder on the inside of cup 12. Flange 16a is pressed against this shoulder by internal pressure within the container so that the seal between the plug and the container is improved as the pressure increases. The flange also prevents the plug from being accidentally pushed outwardly through passage 14 because of internal pressure and allows displacment of the plug only inwardly from passage 14 into the container.

There are various advantages in having passage 14 in cap 12, including the ability to insert plug 16 more easily; but it will be apparent without further illustration that passage 14 and sump 15 can be located in end wall 11w of the cup, provided the end wall is adequately thickened. Cap 12 then may be as shown except for omission of passage 14 and sump 15.

When the two parts 11 and 12 of the container are assembled, the container is hermetically sealed and cannot be opened or the contents removed except through passage 14 which is the sole means of access to the interior of the finished container.

When initially filled, the container is in the upright position of FIG. 1 and measured quantity of liquid 18 is placed within the cup. This liquid is any material which it may be desired to administer to a plant. In some cases the nutrients or insecticides are liquids themselves. Should the material be normally in solid form, it will be placed in aqueous solution and the body of liquid 18 will be a solution of the material. Above the liquid there is then injected a small quantity of a suitable propellant, immediately after which cap 12 is placed over the open end of the cup. This propellant may be any suitable material; and is normally in liquid or solid form when placed in the container. Well known propellants are the fluorinated hydrocarbons commercially available under the trademark "Freon," for this purpose. Another propellant is carbon dioxide, which can be inserted in the container in either solid or liquid form immediately prior to capping. The carbon dioxide quickly vaporizes as it is a gas at ordinary temperatures.

Typically, the cup portion of the container is filled approximately half full with the liquid 18. The pressure of the gaseous propellant which initially occupies space 19 above the body of liquid 18 is reduced to one-half the initial value as the gas expands to fill the container as the container is emptied. An initial pressure of only slightly above atmospheric, for example 4 or 5 pounds is quite adequate for the uses here intended. Accordingly, gas pressure at the time of filling is normally 10–15 p.s.i., more or less, to allow for some loss of gas drive by permeation through the container walls during storage prior to use.

After the container is filled and capped, it is normally stored in an upright position as in FIG. 1. In order to use the container, a tube 20 is first driven into the stem 21 of a tree or other plant to be treated. Tube 20 is a combined container unsealing and liquid injecting member that is a rigid hollow cylindrical tube, continuously open throughout its full length and sharpened at one end, as by being cut diagonally at one end in order to improve its penetration of the plant stem. Although the tube may be driven into the plant stem in any convenient and suitable manner, it is preferred to set it by means of the tool shown and described in my Patent No. 2,796,701, issued June 25, 1957, for Tool for Placing Feeding Tubes in Plant Stems.

Once injection tube 20 has one end set firmly in the plant stem 21, the other end of the tube is inserted in the open end of fluid passage 14. Passage 14 is preferably cylindrical in shape to match the shape of feeder tube 20 and the tube and passage are of such diameters that the tube snugly fits within the passage, thus insuring a fluid-tight fit in direct contact with the walls of the passage. At the same time, the frictional resistance to movement of the tube within the passage is not so great but what the container can be forced axially of tube 20 to move the tube inwardly of passage 14 to a position such, as shown in FIG. 2, that the inner end of the tube displaces plug 16 from the inner end of passage 14 and thereby opens the passage to receive liquid freely from the interior of the container. While in a strict sense, the liquid flows outwardly through the tube, the liquid also flows through the passage, since the tube may be viewed as a liner for the passage and also as means for conveying the liquid from the container into the plant stem.

Tube 20 is a simple, valve-less structure; but by the sequence of steps mentioned, the wall of the container is breached in a manner to provide free continuous access of the liquid to the plant. Container 10 is also a simple, inexpensive structure devoid of valves or complicated mechanism. The tube makes a fluid-tight seal directly with the container wall at passage 14 without the need of any gasket or added seal; and since this seal is established before plug 16 is displaced, actually in this illustrated design before the plug is moved, no valve is required to control fluid flow. The result is a basic, simple structure.

The bottom wall of sump 15 preferably slopes up and away from the inlet to passage 14 entirely across the sump to the other side of the cap. This single slope helps drain out the liquid content and prevents the displaced plug 16 from engaging the end of passage 14 in a manner to block flow of liquid into the passage 14 and tube 20.

In position for injection, the container is in the inverted position in FIG. 2. Obviously the liquid body therein falls into cap 12 at the bottom of the container and the gas moves to the top. The body of gas is in direct contact with the liquid and it exerts enough pressure thereon to drive it through the tube and into the plant stem. It has been determined by experiment that a dosage of three milliliters can be emptied from a container of this character within two minutes with an initial gas pressure of 4 p.s.i. The gas within the pressurized container not only exerts a driving force on the liquid but prevents the formation of a subatmospheric pressure in the upper portion of the container which would slow up the removal of the liquid from the container. The rapid emptying action insures that a high concentration of the antibiotic or insecticide will be present in the sap stream of the tree. Complete emptying is insured by the downwardly sloping walls and the action of sump 15. It will be appreciated that with a small dosage, usually of the order of 2–5 milliliters, in a container, substantially complete emptying is highly desirable in order to obtain injection of a full strength dose. Also, the quantity of toxic material left in an emptied container is reduced to a minimum level that makes subsequent handling and disposal safe and easy.

According to the improved method and apparatus of my invention, a toxic liquid can be handled and injected into the stem of a plant without any danger from contact by the user with either fumes from the liquid or the liquid itself. The container is inexpensive and is discarded after a single use, as it is not refillable or reusable.

From the foregoing description, it will be understood that various changes in the design, shape, and detailed construction and use of my improved container, may occur to persons skilled in the art without departing from the spirit and scope of my invention. Accordingly, it is to be understood that the foregoing description is considered to be illustrative of, rather than limitative upon, the invention as defined by the appended claims.

I claim:

1. A non-refillable, single-dosage treatment device for injecting a liquid into a stem of a plant, comprising:
   a sealed hollow container having a discharge passage extending through the container wall;
   a measured quantity of a liquid within the container to be administered to the plant;
   a displaceable plug slidably received in the discharge passage closing the passage at its inner end to fluid flow, said plug being shorter than the passage and displaceable inwardly only of the passage to open the passage;
   a body of gaseous propellant in the container above and in direct contact with the liquid therein at a pressure above atmospheric;
   and a container unsealing and liquid injecting member, said member comprising a rigid tubular member continuously open throughout its full length and sharpened at one end to penetrate a plant stem, the other end of the tubular member having an external diameter sized to be received snugly with a fluid-tight fit in the container discharge passage and to displace said plug inwardly from the passage into the container to open the passage to free discharge of said liquid through said tubular member into a plant, the passage being long enough to establish a fluid-tight fit with the passage wall before the plug is out of the passage.

2. A treatment device as in claim 1 in which the discharge passage constitutes the sole access means to the interior of the container from the exterior thereof.

3. A treatment device as in claim 1 in which an integral portion of the container wall is thickened and the discharge passage is in said thickened portion with the tubular member in direct contact with the container wall at said thickened portion.

4. A treatment device as in claim 1 in which the container comprises:
   a pair of cup-like members of cylindrical configuration engaging each other in telescoping relation,
   the cup-like members having mutually inter-fitting portions providing a fluid-tight fit with each other;
   and means locking the two cup-like members in fully telescoped, fluid-tight relation to each other and preventing a separation of the two cup-like members.

5. A treatment device as in claim 4 in which the locking means comprises a pair of oppositely facing shoulders, one on each of the respective cup-like members, engaged by relative axial movement of the two cup-like members.

6. A treatment device as in claim 1 in which the container comprises:
   a cup of cylindrical configuration open at one end and closed at the other;
   a cap telescopically engaging the cup to close the open end thereof with a fluid-tight fit;
   means locking the cup and cap together in a tightly fitting position to prevent separation of the cup and cap, said locking means being non-releasable.

7. A treatment device as in claim 6 in which the cap has a thicker wall than the cup and the discharge passage is in said thicker portion of the container wall, the tubular member being in direct contact with the wall.

8. A treatment device as in claim 6 in which the cup is high density polyethylene and has relatively thinner, more rigid walls and the cap is low density polythylene and has relatively thicker, slightly deformable walls that are elastic and afford sliding fit of a fluid-tight nature with the cup and the tubular member.

9. A non-refillable, single-dosage treatment device for injecting a liquid into a stem of a plant, comprising:
   a disposable, sealed hollow container of a light-weight, non-metallic material having a portion formed with a wall relatively thicker than the major portion of the container and a discharge passage extending through said thicker wall portion;
   a quantity of liquid within the container to be administered to the plant;
   a body of gaseous propellant in the container above and in direct contact with the liquid therein at a pressure above atmospheric;
   a displaceable plug slidably received in the discharge passage at the inner end thereof to close the passage to fluid flow, said plug being displaceable only inwardly of the passage to open the passage, said passage constituting the sole means of access to the interior of the container;
   and a container unsealing and liquid injecting member, said member comprising a rigid tubular member continuously open throughout its full length and sharpened at one end to penetrate a plant stem, the other end of the member having an external diameter of a size to fit snugly in said discharge passage and to displace said plug inwardly from the passage into the container to open the passage to free discharge of said liquid through said tubular member,
   the thickened wall portion of the container being elastic and slightly deformable to receive the tubular member with a fluid-tight fit in the discharge passage in direct contact with the container body.

No references cited.

ABRAHAM G. STONE, *Primary Examiner.*
ROBERT E. BAGWILL, *Assistant Examiner.*